United States Patent [19]
Satran et al.

[11] Patent Number: 5,924,824
[45] Date of Patent: Jul. 20, 1999

[54] CUTTING INSERT

[75] Inventors: Amir Satran, Kfar Vradim; Yuri Men, Haifa, both of Israel

[73] Assignee: Iscar Ltd., Migdal Tefen, Israel

[21] Appl. No.: 08/910,902

[22] Filed: Aug. 13, 1997

[30] Foreign Application Priority Data

Aug. 22, 1996 [IL] Israel .......................................... 119113

[51] Int. Cl.$^6$ ....................................................... B23C 5/20
[52] U.S. Cl. ................................ 407/34; 407/48; 407/54; 407/62
[58] Field of Search ................................ 407/62, 34, 43, 407/47, 48, 51, 53, 54, 55, 56, 58, 64, 113, 114

[56] References Cited

U.S. PATENT DOCUMENTS

| | | | |
|---|---|---|---|
| 4,252,480 | 2/1981 | Mizuno et al. | |
| 4,527,930 | 7/1985 | Harroun | 407/48 X |
| 4,623,285 | 11/1986 | Costil | 407/62 X |
| 5,221,162 | 6/1993 | Okawa | 407/48 X |
| 5,622,460 | 4/1997 | Satran et al. | 407/54 X |

FOREIGN PATENT DOCUMENTS

| | | |
|---|---|---|
| 0 307 894 | 3/1989 | European Pat. Off. |
| 0 307 949 | 3/1989 | European Pat. Off. |
| 0 620 071 | 10/1994 | European Pat. Off. |
| 2135612 | 9/1984 | Germany ................................. 407/53 |
| 2146276 | 4/1985 | Germany ................................. 407/113 |
| 2 146 276 | 4/1985 | United Kingdom. |

*Primary Examiner*—Frances Han
*Assistant Examiner*—Henry W. H. Tsai
*Attorney, Agent, or Firm*—Pennie & Edmonds LLP

[57] ABSTRACT

A cutting insert for mounting in a cutting tool, comprises a cutting head portion with a substantially arcuate cutting edge and a substantially trapezoidal mounting body portion integrally formed therewith. The mounting body portion has substantially planar upper and lower surfaces and substantially straight side surfaces converging in the direction away from the cutting head portion. The entire cutting edge of the cutting head portion lies on a sphere and defines an arc substantially less than 90°, the cutting head portion having an imaginary chordal plane passing through peripheral ends of the arc. The side surfaces of the mounting body portion are directed substantially radially with respect to a center of the sphere and are substantially shorter than the length of the chordal plane.

35 Claims, 7 Drawing Sheets

CUTTING INSERT

FIELD OF THE INVENTION

The present invention refers to an exchangeable cutting insert, particularly, of the kind used in end mills. The invention also refers to an end mill such as a ball-nose end mill and is specifically useful for ball-nose end mills of medium diameters.

BACKGROUND OF THE INVENTION

A ball-nose end mill may be characterized by having, at its leading end, at least one effective cutting edge in the form of an arc of one quarter of a circle so that, upon the rotation of the end mill about its longitudinal axis, the cutting edge generates a hemisphere of a desired radius.

Depending on the cutting diameter of a ball-nose end mill, the effective cutting edge thereof can be obtained either by the use of a full-length single cutting insert with an arcuate cutting edge of 90°, which is typical for the tools with very small cutting diameters, or, in large tools, by the use of a plurality of partial length cutting inserts having overlapping arcuate cutting edges each being defined by an arcuate length less than 90°.

A small diameter ball-nose end mill with a single cutting insert is disclosed, for example, in Assignees' U.S. Pat. No. 5,622,460.

A large diameter ball-nose end mill comprising a plurality of cutting inserts mounted at a leading end of a tool holder is disclosed in EP 307 949. The cutting inserts are each rather small relative to the radial dimension of the tool holder and have relatively short arcuate cutting edges which overlap, when the inserts are mounted in the tool, whereby the possibility is provided for the use of the same inserts with tool holders with different cutting diameters and chip splitting is facilitated. Each cutting insert is of a generally triangular shape and has three identical indexable cutting edges. When such a cutting insert is mounted in a tool holder, one of its cutting edges is disposed in its operative position and the other two cutting edges define the insert body portion for mounting the insert in an insert receiving pocket. Consequently, the insert mounting space directly depends on the length of its cutting edges.

Whilst the above dependency may be perfectly tolerable in large tools, it is not suitable for smaller cutting tools where the size of a cutting insert is commensurate with the radial dimension of the tool. The use in such tools of cutting inserts requiring relatively large dimensions of insert receiving pockets, weakens the tool and limits the number the pockets which can be formed in the tool holder. Thus, known end mills of medium diameters usually employ only two inserts as a required minimum. An example of an end mill of this kind is disclosed in U.S. Pat. No. 4,252,480. The end mill comprises two indexable cutting inserts with cutting edges each of which has an arcuate a length of less than 90°, and which are mounted so that the cutting edges overlap to obtain an effective full-length cutting edge. However, the effectiveness of this end mill is not high.

To increase the effectiveness, U.S. Pat. No. 4,527,930 suggests the use of two identical non-indexable cutting inserts with full-length cutting edges, which are mounted symmetrically at a leading end portion of a tool holder. Each cutting insert comprises a substantially arcuate cutting head portion and a substantially trapezoidal mounting body portion integrally formed therewith. The cutting head portion has an extremely long cutting edge having a portion which defines an arc of 90° and a straight portion continuous therewith. The mounting body portion has substantially planar upper and lower surfaces and substantially straight side walls converging in the direction away from the cutting head portion.

However, with the cutting edge of the insert described in U.S. Pat. No. 4,527,930 being very long, its mounting body portion still has substantial dimensions and, consequently, requires a relatively large insert receiving pocket. Moreover, the symmetrical arrangement of the inserts in the tool does not allow to effectively obtain center cutting without severely reducing the tool integrity.

It is therefore the object of the present invention to provide a new end mill and a new cutting insert for use therein, in which the above disadvantages are overcome.

SUMMARY OF THE INVENTION

In accordance with the present invention, there is provided a cutting insert for mounting in a cutting tool, comprising a cutting head portion with a substantially arcuate cutting edge and a substantially trapezoidal mounting body portion integrally formed therewith;

said mounting body portion having substantially planar upper and lower surfaces and substantially straight side surfaces converging in the direction away from said cutting head portion;

characterized in that the entire cutting edge of said cutting head portion lies on a sphere and defines an arc substantially less than 90°, the cutting head portion having an imaginary chordal plane passing through peripheral ends of said arc, said side surfaces of the mounting body portion being directed substantially radially with respect to a center of said sphere and being substantially shorter than the length of said chordal plane.

Preferably, the cutting insert is adapted for use in a ball-nose end mill comprising a tool holder with a hemispherical leading end portion, said side surfaces of the insert mounting body portion being shorter than a radial dimension of said leading portion.

With the above design, the trapezoidal mounting body portion has reduced dimensions both along said chordal plane and perpendicularly thereto, whereby the area of the mounting body portion can be reduced to a minimum which is, in fact, defined solely by clamping requirements. The mounting body portion may be reduced to such an extent that said imaginary chordal plane crosses a clamping screw bore formed in the mounting body portion. Thus, with the insert mounting body portion being reduced, an insert receiving pocket formed in the tool holder and, consequently, a chip gullet associated therewith can be relatively shallow, whereby the tool holder can be rendered essentially stronger.

Preferably, said cutting edge of the insert slopes downwardly from a central region of the cutting edge in the direction towards the insert lower surface so that the thickness of the cutting head portion at least adjacent one of its peripheral ends is minimal. This design and, particularly, the minimal thickness of the cutting head portion at its peripheral end region, enables positioning of the insert in the vicinity of a leading end of the tool holder so as to provide center cutting. On the other hand, by virtue of the central region of the cutting head portion being relatively thick, the latter is strengthened at an area thereof closest to a clamping screw bore formed in the mounting portion.

Preferably, the thickness of the mounting body portion defined between the upper and lower surfaces thereof substantially equals the minimal thickness of the cutting head portion so that a major portion of the cutting edge projects above the upper surface of the mounting body portion. In this case, a rake surface along the cutting edge slopes downwardly from the cutting edge towards the upper surface of the mounting body portion, whereby appropriate positive rake angles of the insert can be achieved without undue weakening of its cutting wedge.

Preferably, said rake surface is continuously curved along the cutting edge so as to present an invariant rake angle when the insert is mounted in the tool.

Preferably, a relief flank surface of the insert adjacent the cutting edge slopes outwardly from the cutting head portion, by virtue of which the cutting wedge of the insert can be essentially strengthened. Alternatively, the relief flank surface may be substantially cylindrical conforming with the outline of the cutting edge.

Preferably, the cutting edge of the cutting head portion and the mounting body portion of the cutting insert are symmetrical with respect to a plane bisecting the angle defined between the side surfaces of the mounting body portion. By virtue of this, the cutting edge of the insert is neutral and the insert can be equally used for any of right- and left-handed applications. Alternatively, the cutting edge may be asymmetrical and have a right- or left-hand design. The preferable shape of the cutting edge can be defined as a three-dimensional arc formed by an intersection of the sphere on which the cutting edge lies with a cylinder. This ensures that, when the insert is mounted in a tool, its axial rake angle is not negative along the entire length of the cutting edge, but rather only the leading end of the insert.

Preferably, the cutting insert is double-sided and has a plane of symmetry passing between said upper and lower surfaces of the mounting body portion and parallel thereto, which plane divides the insert mounting portion into symmetrical upper and lower parts and the cutting head portion into two parts with either symmetrical or anti-symmetrical indexable upper and lower cutting edges, the cutting edges being formed by the intersection between upper and lower rake surfaces with their interconnecting relief flank surface. Each cutting edge can be either neutral or specifically handed.

Preferably, the relief flank surface comprises upper and lower relief flank portions disposed adjacent respective upper and lower cutting edges and merging with each other via an intermediate relief flank portion which may be substantially cylindrical or toroidal.

In accordance with the present invention, there is also provided an end mill assembly comprising a tool holder having a longitudinal axis of rotation and at least one insert receiving pocket with a cutting insert releasably mounted therein by clamping means;

said cutting insert comprising a cutting head portion with a substantially arcuate cutting edge and a substantially trapezoidal mounting body portion integrally formed therewith;

said mounting body portion having substantially planar upper and lower surfaces and substantially straight side surfaces converging in the direction away from said cutting head portion;

the insert receiving pocket having a shape mating the shape of the insert body portion;

characterized in that the entire cutting edge of said cutting head portion of the cutting insert lies on a sphere and defines an arc substantially less than 90°, said cutting head portion having an imaginary chordal plane passing through peripheral ends of said arc, said side surfaces of the mounting body portion being directed substantially radially with respect to a center of said sphere and being substantially shorter than the length of said chordal plane.

Preferably, the end mill is of a ball-nose type and the tool holder has a hemispherical leading end portion, said side surfaces of the insert mounting body portion being shorter than a radial dimension of said tool holder leading portion.

In a preferred embodiment of the present invention, said one insert receiving pocket is formed in the vicinity of a leading end of the tool holder so that one end of the cutting insert is located adjacent said longitudinal axis to provide center cutting.

In a further preferred embodiment of the present invention, the end mill assembly comprises at least two, and preferably three identical cutting inserts, the tool holder being formed with a corresponding number of the insert receiving pockets arranged at unequal angular pitch with respect to each other and at different distances from the leading end of the tool holder so that operative cutting edges of the cutting inserts mounted therein generate, upon rotation of the tool assembly, overlapping surfaces of revolution defining a hemisphere of a desired radius.

In the end mill assembly comprising three cutting inserts, it is preferable that a first pocket which is disposed adjacent the leading end of the tool holder and a second pocket disposed at a greatest distance from the leading end of the tool are located substantially on one side of a plane passing through the longitudinal axis of the tool holder and a third pocket is located substantially on another side of said plane. The cutting inserts mounted in the first and second pockets are disposed so that their operative cutting edges overlap to define a 90°-arcuate cutting edge of the tool and the cutting insert mounted in the third pocket is mounted so as to double the effectiveness of cutting obtained by the end mill at its periphery.

With the end mill assembly according to the present invention, the reduced area of the insert receiving pockets enables tool holders of relatively small diameters to effectively accommodate a plurality of cutting inserts, whereby the effectiveness of cutting operations can be significantly increased.

DESCRIPTION OF THE DRAWINGS

For a better understanding of the present invention and to show how, by way of examples only, the same may be carried out in practice, reference will now be made to the accompanying drawings, in which.

DETAILED DESCRIPTION OF THE PREFERRED EMBODIMENTS

FIGS. 1 to 7 illustrate a cutting insert 1 according to the present invention for use in a ball-nose end mill assembly of the kind shown in FIGS. 8 to 13 and having a desired cutting radius R.

As seen, the cutting insert 1 has a substantially arcuate cutting head portion 2 with upper and lower indexable cutting edges 3 and 4 defined by an intersection of upper and lower rake surfaces 5 and 6 with a front relief surface 7, and a mounting body portion 9 of a substantially trapezoidal shape formed integrally with the cutting head portion 2. The mounting body portion 9 has substantially planar upper and lower surfaces 10 and 11 which are parallel to each other and merge with respective upper and lower rake surfaces 5 and 6 of the cutting head portion 2, and substantially straight side surfaces 12 and 13 converging in the direction away from the cutting head portion 2.

Figure 2:
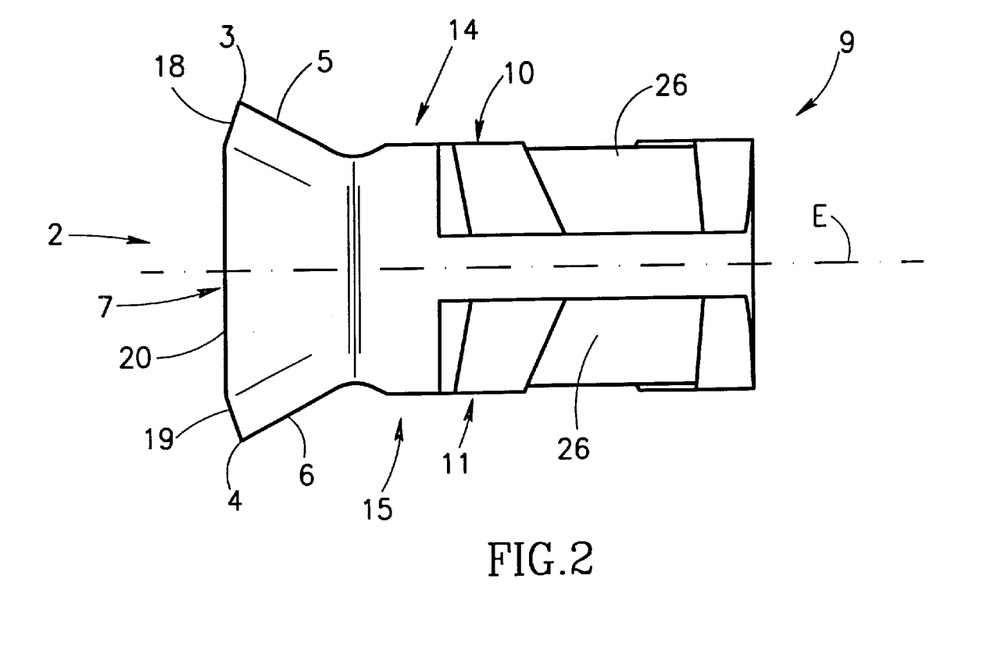
FIG. 2 is an orthogonal side view of the cutting insert shown in FIG. 1.
Figure 3:
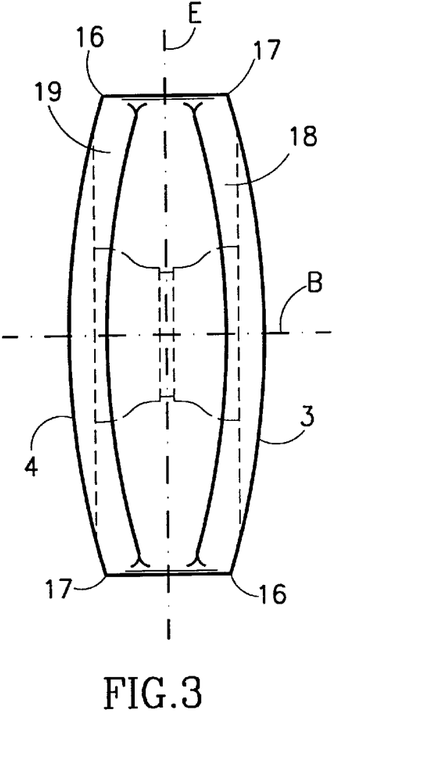
FIG. 3 is a front view of the cutting insert shown in FIG. 1.
Figure 4:
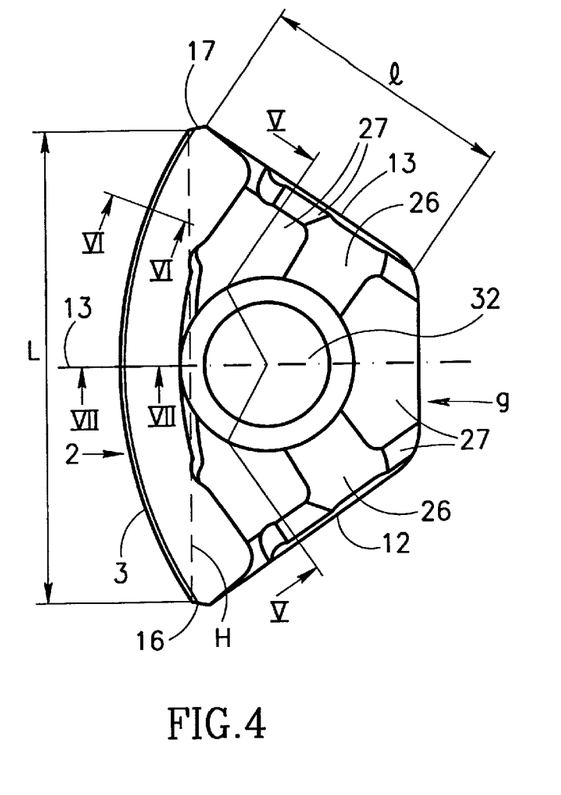
FIG. 4 is a plan view of the cutting insert shown in FIG. 1.

As seen in FIGS. 2, 3 and 4, the cutting insert 1 is double-sided and its cutting edges 3 and 4 and mounting body portion 9 have a mirror symmetry with respect to two mutually perpendicular planes of symmetry, namely a plane E which passes between the upper and lower surfaces 10 and 11 of the mounting body portion 9 and divides the insert into identical upper and lower parts 14 and 15, and a plane B which bisects the angle defined between the side surfaces 12 and 13 of the mounting body portion 9 and which is perpendicular to the plane of symmetry E. By virtue of this design, the cutting edges 3 and 4 are indexable and also neutral so that each of them can be equally used for any of right- and left-handed applications. In view of the upper and lower parts 14 and 15 with the respective cutting edges 3 and 4 being identical, only the upper part 14 with the upper cutting edge 3 will be described hereinbelow.

Figure 1:
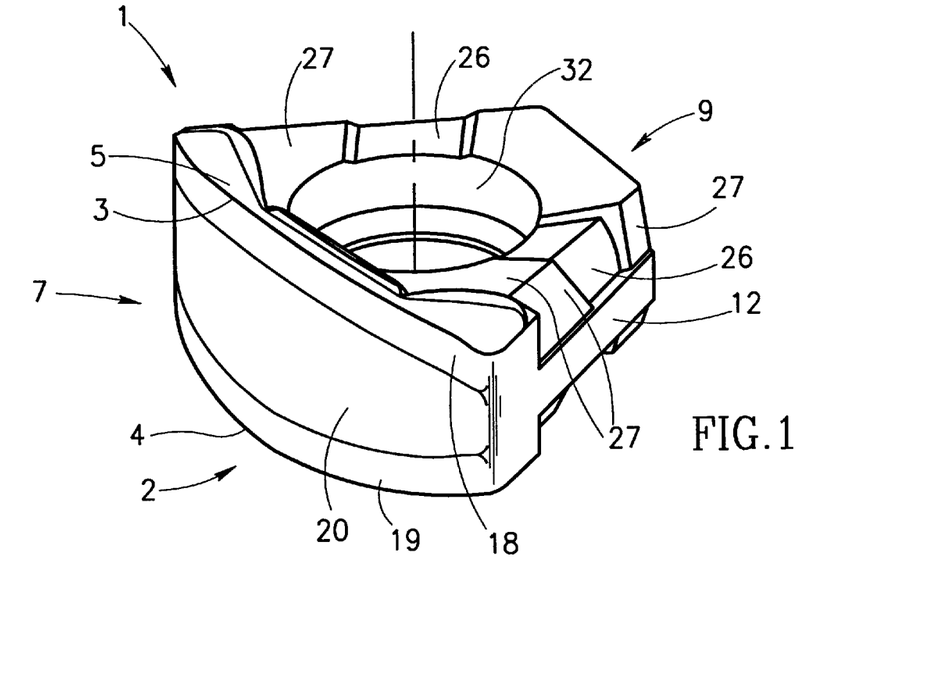
FIG. 1 is an isometric view of a cutting insert according to the present invention.

As seen in FIGS. 1, 3 and 4, the cutting edge 3 is in the form of an arc which has an included angle, preferably, about 70° and which lies on an imaginary sphere having a radius equal to the cutting radius R of the end mill. The cutting edge 3 is, preferably, defined by an intersection of the sphere with a cylinder. Orthogonal projections of such a cutting edge as seen in FIGS. 3 and 4 can be described by elliptical functions with a ratio between major and minor diameters being respectively in the range 1.2 to 2.7 and 1.1 to 2.4. Preferred values of the ratio for the two projections are respectively 1.8 and 1.6. With such a shape, the cutting edge 3 as seen in FIG. 3 slopes downwardly from a central region thereof towards peripheral ends 16 and 17 of the cutting edge and the thickness of the cutting head portion 2 defined by a height of the front relief surface 7 thereof between the two cutting edges 3 and 4 adjacent the peripheral ends 16 and 17 is minimal and adjacent the central region of the cutting edge is maximal.

As seen in FIG. 2, a major portion of the cutting edge 3 projects above the upper surface 10 of the mounting body portion 2 so that the rake surface 5 of the cutting head portion 2 slopes downwardly from the cutting edge 3 towards the upper surface 10 of the mounting body portion 9. This is obtained by the thickness of the mounting body portion 9 which is defined between the upper and lower surfaces 10 and 11 thereof, being substantially equal to the minimal thickness of the cutting head portion 2 at its peripheral ends 16 and 17. This geometry results in achieving enhanced positive rake angles without the necessity to provide a deep chip forming groove along the entire cutting edge. Thus, as illustrated in FIG. 6, a relatively shallow chip forming groove appears only towards the peripheral ends 16 and 17.

Figure 6:
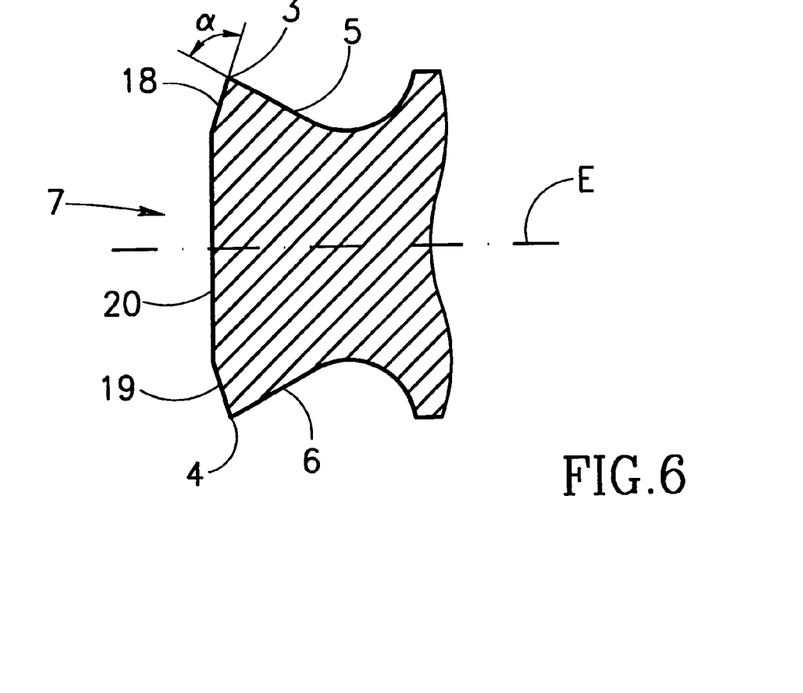
FIG. 6 is a cross-sectional view along the line VI—VI of the cutting insert shown in FIG. 4.
Figure 7:
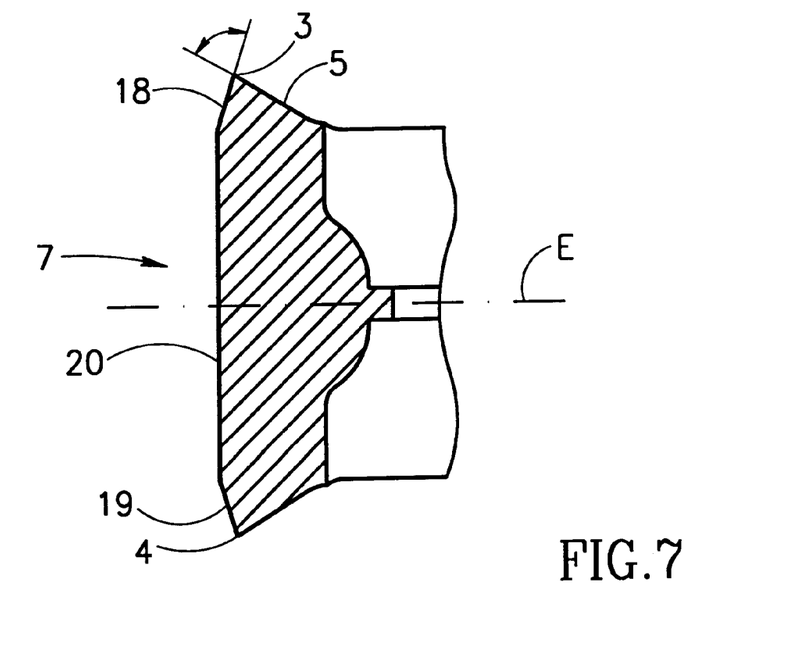
FIG. 7 is a cross-sectional view along the line VII—VII of the cutting insert shown in FIG. 4.

It may be seen in FIGS. 1, 6 and 7 that the rake surface 5 is continuously curved along the cutting edge 3 so that an angle defined thereby with the plane of the upper surface 10 slightly varies to present an invariant rake angle, when the insert is mounted in the tool.

As seen in FIGS. 2, 6 and 7, the relief flank surface 7 of the cutting head portion 2 comprises upper and lower relief flank portions 18 and 19 and an intermediate cylindrical relief flank portion 20. The upper and lower relief flank portions 18 and 19 slope outwardly from respective cutting edges so as to define a substantially constant wedge angle a therealong.

FIG. 4 generally illustrates the size proportion of the trapezoidally shaped insert mounting body portion 9 relative to the length of the cutting edge 3. As indicated, the maximal width of the mounting body portion at its merging with the cutting head portion 2 is defined by the length L of an imaginary chordal plane H passing through the peripheral ends 16 and 17 of the cutting edges 3 and 4. The length of the mounting body portion 9 is defined by the length l of the side surfaces. It can be readily seen that the length l of the side surfaces is substantially shorter than the length L of the chordal plane H.

Figure 5:
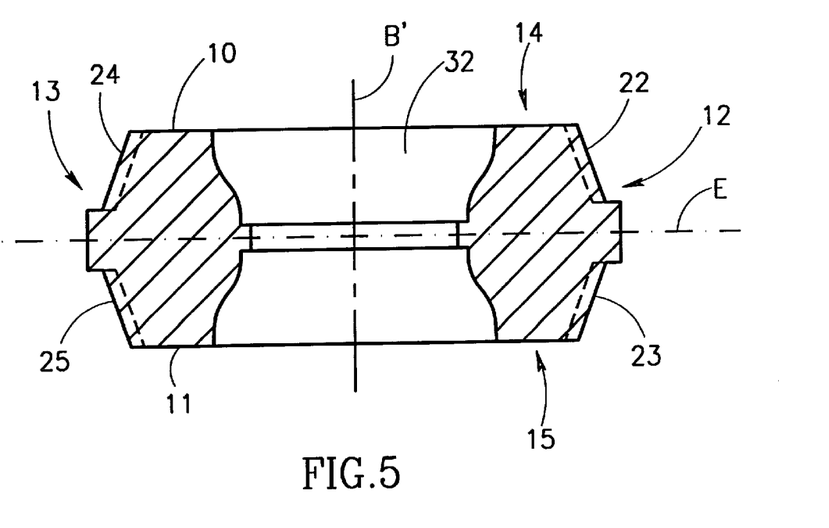
FIG. 5 is a cross-sectional view along the lines V—V of the cutting insert shown in FIG. 4.

As seen in FIG. 5, the side surfaces 12 and 13 of the mounting body portion 9 are each formed with a respective pair of upper and lower bevelled portions 22, 23 and 24, 25 directed outwardly relative to the adjacent upper and lower surfaces 10 and 11. As shown in FIGS. 1, 2 and 4, the upper and lower surfaces 10 and 11 and the upper and lower portions 22, 23 and 24, 25 of the insert side surfaces 12 and 13 are formed with relatively shallow recesses 26 to establish distinct areas designated as 27 for the contact of the insert, when mounted in the tool, with corresponding surfaces of an insert receiving pocket.

Figure 8:
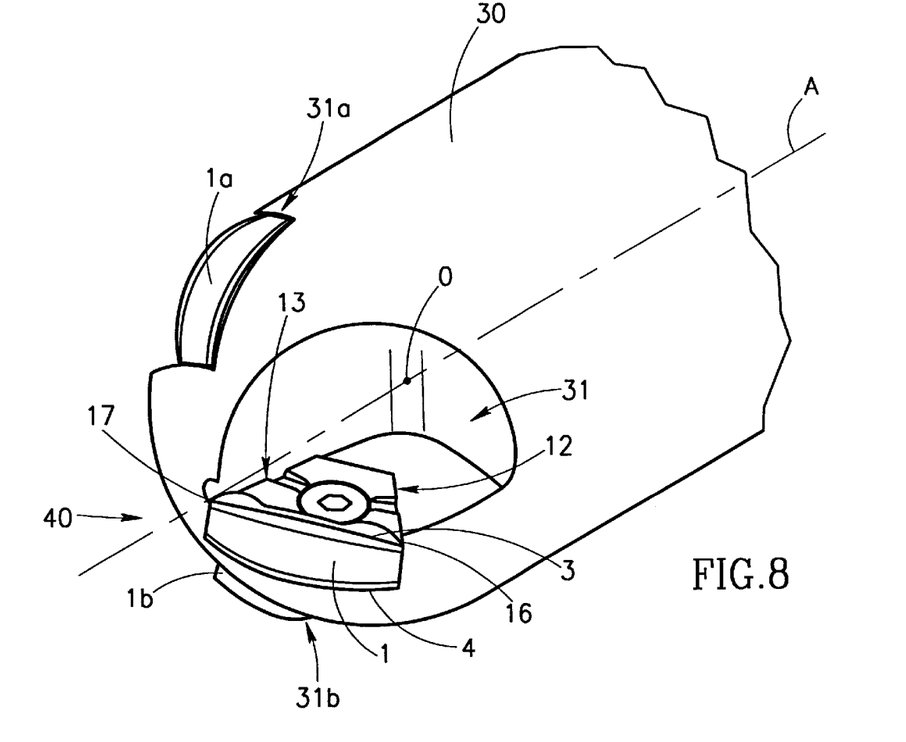
FIG. 8 is an isometric view of an end mill according to the present invention.

FIGS. 8 to 13 illustrate the end mill according to the present invention. As seen in FIG. 8, the end mill comprises a tool holder 30 formed with three insert receiving pockets 31, 31a and 31b and three cutting inserts 1, 1a and 1b of the kind described above, mounted therein so as to be oriented generally radially with respect to a longitudinal axis A of the end mill. Upon the rotation of the end mill about the longitudinal axis A of the end mill, an operative cutting edge 3, 3a, 3b of each cutting insert 1, 1a, 1b generates a sector of a spherical surface with a center O and the radius R.

Figure 10:
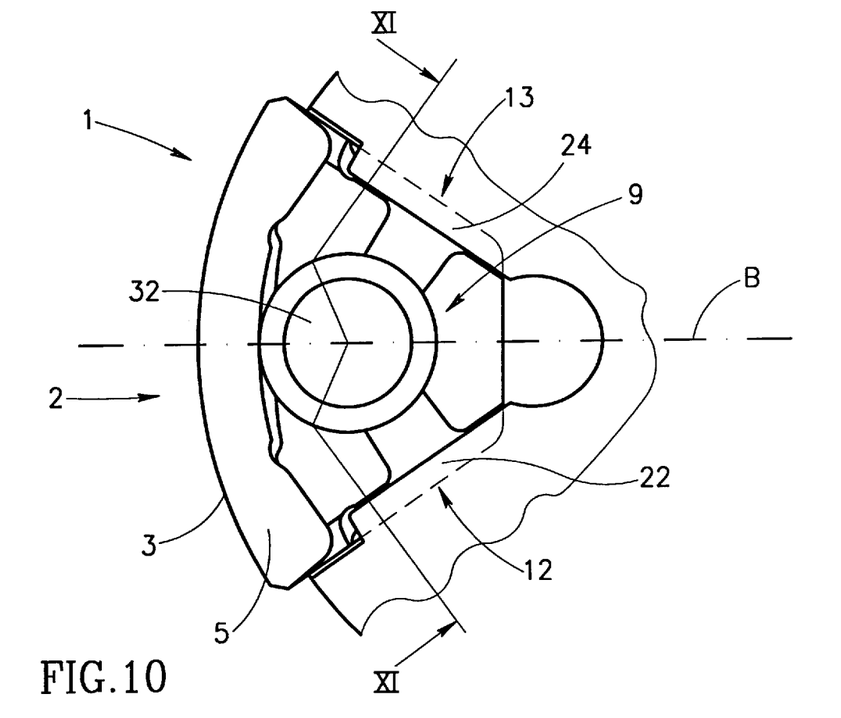
FIG. 10 is an enlarged plan view of the insert shown in FIGS. 1 to 7, when mounted in an insert receiving pocket of the end mill shown in FIGS. 8 and 9.
Figure 12:
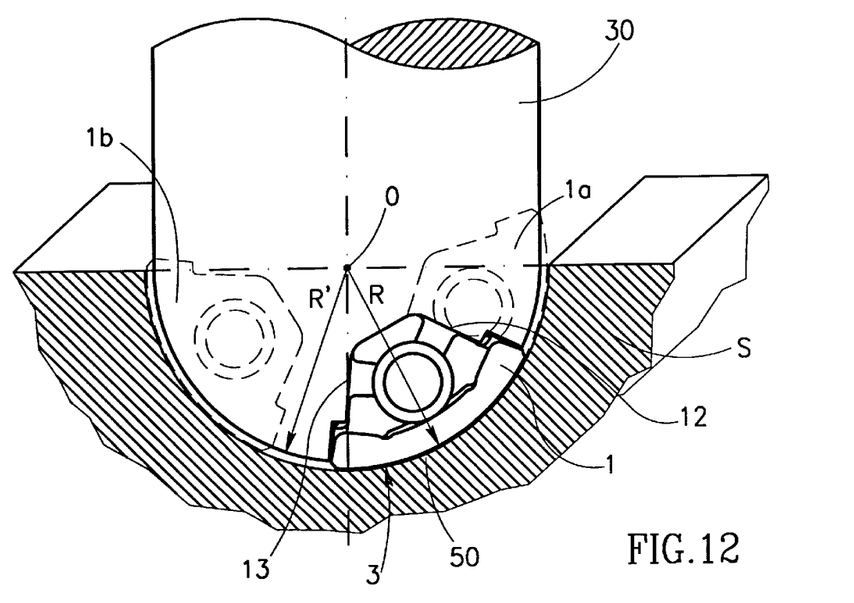
FIG. 12 is a schematic view of the end mill shown in FIGS. 8 and 9 during a cutting operation.

As is the case regarding all the cutting inserts, but shown in FIGS. 8, 10 and 12 only with respect to the cutting insert 1, the side surfaces 12 and 13 of the insert mounting body portion 9 converge in the direction away from the cutting head portion 2 of the insert so that they are directed radially with respect to the center O of the spherical surface. As best seen in FIG. 12, the side surfaces 12 and 13 of the mounting body portion 9 are substantially shorter than the radial dimension R' of the tool holder 30.

With the insert body portion having the design and proportion as described above, the area required for mounting of the insert body portion in the end mill tool holder is essentially reduced, being in fact defined solely by the area required for the clamping screw bore 32. Consequently, even when the tool holder has a medium or a small diameter, e.g. 28 to 35 mm, it can effectively accommodate more than two cutting inserts, by virtue of which the effectiveness of cutting operations can be significantly increased.

Figure 11:
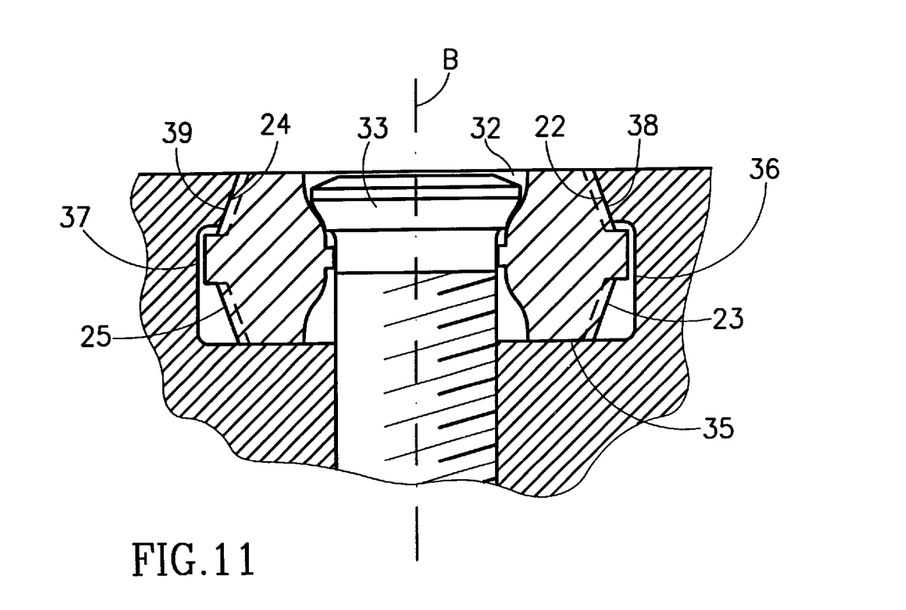
FIG. 11 is a cross-sectional view along the lines XI—XI of the cutting insert shown in FIG. 10.

As seen in FIG. 10 and specifically shown in FIG. 11 with respect to the cutting insert 1, the cutting inserts 1, 1a and 1b are retained in their respective insert receiving pockets 31, 31a and 31b with a dove-tail arrangement, by a clamping counter-sunk screw 33, which, as seen in FIG. 8, is oriented transversely to a radial plane in which each cutting insert is generally oriented.

The insert receiving pocket 31 has a pocket base 35 and pocket side walls 36 and 37 having upper bevelled portions 38 and 39, which support the insert mounting body portion 9 at corresponding regions 27 of the lower surface 11 and of the upper portions 22 and 24 of the side surfaces 12 and 13 thereof.

Figure 9:
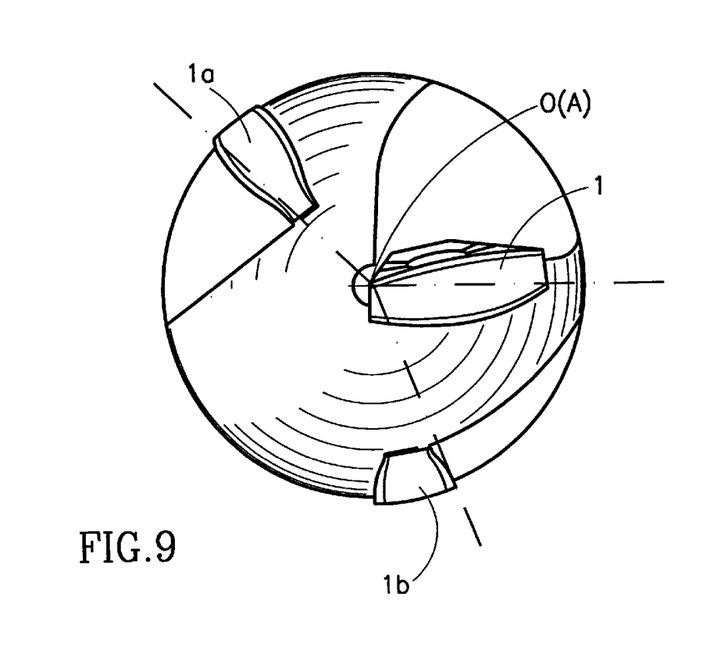
FIG. 9 is a front view of the end mill shown in FIG. 8.

Reverting to FIGS. 8 and 9, the insert receiving pockets 31, 31a and 31b are formed in the tool holder 30 arranged at unequal angular pitch with respect to each other and so that the insert receiving pocket 31 is located in the vicinity of a leading end 40 of the tool holder 30 and two other insert receiving pockets 31a and 31b are formed at different distances from the leading end 40. The insert receiving pocket 31 which is located adjacent the leading end 40 of the tool holder and the insert receiving pocket 31a which is located at a greatest distance from the leading end of the tool are located substantially on one side of an imaginary plane in which the longitudinal axis of the tool holder lies, and the insert receiving pocket 31b is located substantially on another side of this plane.

Figure 13:
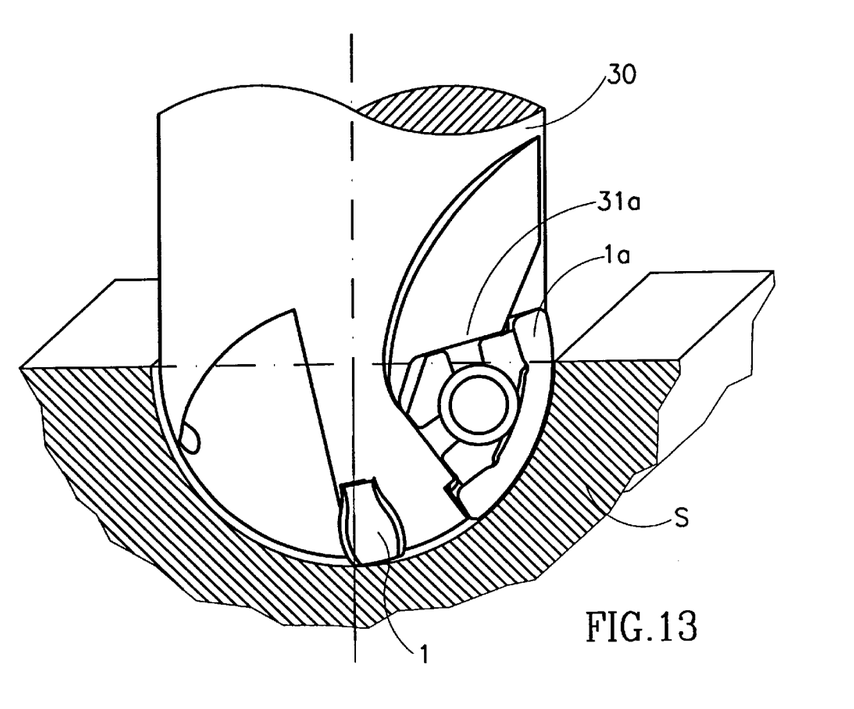
FIG. 13 is a side view of the end mill shown in FIG. 12.

It is illustrated in FIGS. 12 and 13 that, by virtue of the above arrangement, the cutting insert 1 mounted in the insert receiving pocket 31 cuts a central region of a machined surface S while the cutting inserts 1a and 1b mounted in the respective insert receiving pockets 31a and 31b cut at a periphery thereof. It should be mentioned here that the specific design of the cutting insert according to the present invention, in which the cutting head portion of the insert has its minimal thickness at the peripheral ends of the cutting edges, is particularly advantageous for the cutting insert 1 mounted in the insert receiving pocket 31, seeing that the cutting insert 1 is disposed in the critical vicinity of the leading end 40 of the tool holder, as best seen in FIG. 9, where, to permit center cutting, the operative cutting edge 3 intersects the longitudinal axis of rotation A.

As seen in FIG. 12, an effective cutting edge 50 of the described end mill is constituted by the mutually overlapping operative cutting edges 3 and 3a of the cutting inserts 1 and 1a which generate, upon the rotation of the end mill, a hemisphere of the radius R. The use of the operative cutting edge 3b of the cutting insert 1b increases the effectiveness of the cutting operation at the periphery of the machined surface. When the hemisphere does not need to be perfect, a limited range of average cutting radii can be obtained by the use of the same inserts with different tool holders, where the mutual disposition of insert receiving pockets and of the orientation of the inserts therein is chosen appropriately.

Many modifications and variations of the cutting insert and the end mill according to the present invention are possible in the light of the main features thereof described above.

Figure 15:
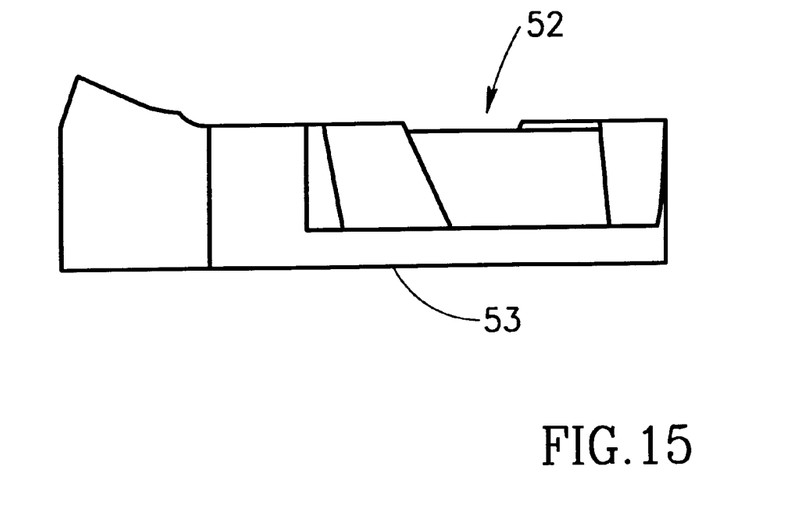
FIG. 15 is a side view of a single sided insert.

Thus, for example, the number of cutting inserts used in the end mill can be less or greater than three. The cutting inserts can be singlesided, as shown in FIG. 15, in which case the insert will not posses the plane of symmetry E but will rather have upper and lower surfaces 52 and 53.

Figure 14:
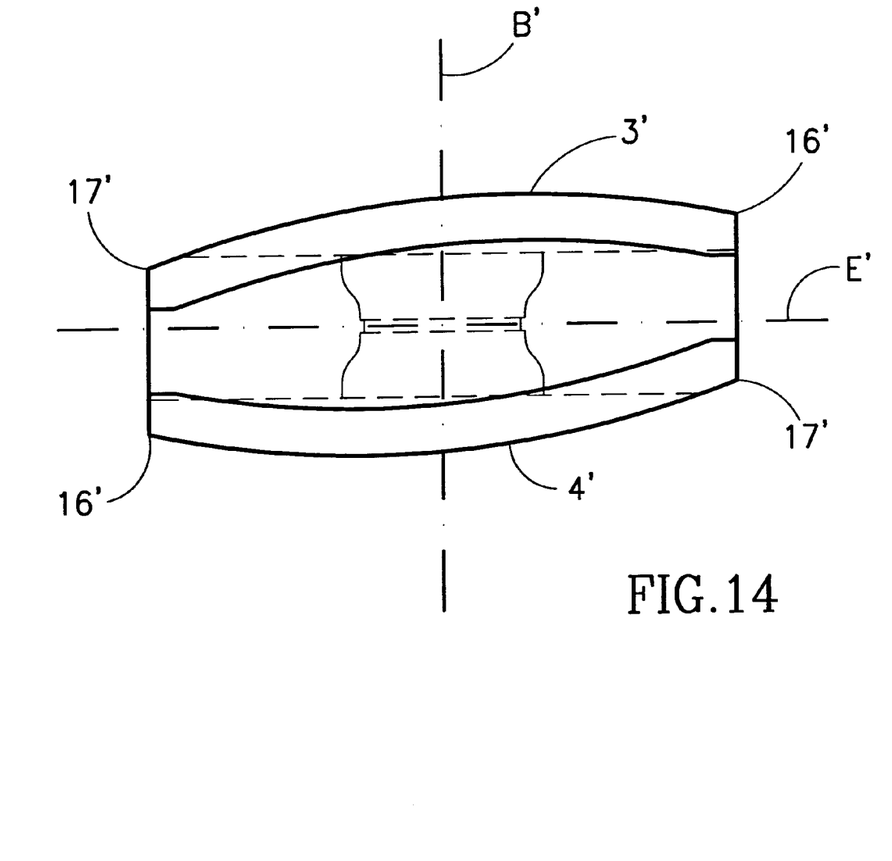
FIG. 14 is a front view of an insert having a non-symmetrical cutting head portion.

As shown in FIG. 14, the cutting edges of the cutting insert can be asymmetric with respect to a bisecting plane B' of the insert mounting body portion and be anti-symmetric with respect to a plane of symmetry E' dividing the insert into upper and lower parts. Thereby, the cutting edges of the insert are specialized for either right-hand or left-hand application.

Rake surfaces of the cutting head portion may be provided with appropriate chip forming means and intermediate portion of the front relief flank surface may be substantially toroidal.

LIST OF REFERENCE NUMERALS:

1 cutting insert
2 cutting head portion
3, 4 cutting edges
5, 6 upper and lower rake surfaces
7 front relief surface
9 mounting body portion
10, 11 upper and lower surfaces of the mounting body portion
12, 13 side surfaces of the mounting body portion
14, 15 upper and lower parts of the insert
16, 17 peripheral ends of the cutting edges 3 and 4
18, 19 upper and lower relief flank portions
20 intermediate relief flank portion
22, 23, 24, 25 upper and lower bevelled portions of the side surfaces 10 and 11
26 recesses
30 tool holder
31, 31a, 31b insert receiving pockets
32 clamping screw bore
33 clamping screw
35 pocket base
36, 37 pocket side walls
38, 39 bevelled portions of the pocket side walls
40 leading end of the tool holder 30
50 cutting edge of the end mill
52, 53 upper and lower surfaces of a single-sided insert
A longitudinal axis of rotation
B bisector plane
E plane of symmetry
H chordal plane
L length of the chordal plane
l length of the side surfaces of the mounting body portion
O center of the hemisphere
R cutting radius

We claim:

1. A cutting insert for mounting in a cutting tool having a longitudinal axis, the cutting insert comprising a cutting head portion with a substantially arcuate cutting edge and a substantially trapezoidal mounting body portion integrally formed therewith;

said mounting body portion having substantially planar upper and lower surfaces and substantially straight side surfaces converging in the direction away from said cutting head portion;

the entire cutting edge of said cutting head portion lying on a sphere and defining an arc substantially less than 90°, the cutting head portion having an imaginary chordal plane passing through peripheral ends of said arc, said side surfaces of the mounting body portion being directed in a substantially radial direction with respect to a center of said sphere, and being substantially shorter than a length of said chordal plane extending between said peripheral ends of the arc; wherein said cutting edge is an upper cutting edgy which slopes downwardly from a central region of the cutting edge towards said lower surface so that the height of the cutting head portion at its front relief surface adjacent at least one of said peripheral ends has a minimal value, the thickness of the mounting body portion defined between said upper and lower surfaces thereof being substantially equal to said minimal value.

2. A cutting insert according to claim 1, wherein the cutting insert is adapted for use in a ball-nose end mill.

3. A cutting insert for mounting in a cutting tool having a longitudinal axis, the cutting insert comprising a cutting head portion with a substantially arcuate cutting edge and a substantially trapezoidal mounting body portion integrally formed therewith;

said mounting body portion having substantially planar upper and lower surfaces and substantially straight side surfaces converging in the direction away from said cutting head portion;

the entire cutting edge of said cutting head portion lying on a sphere and defining an arc substantially less than 90°, the cutting head portion having an imaginary chordal plane passing through peripheral ends of said arc, said side surfaces of the mounting body portion being directed in a substantially radial direction with respect to a center of said sphere, and being substantially shorter than a length of said chordal plane extending between said peripheral ends of the arc; wherein said cutting edge is an upper cutting edge which slopes downwardly from a central region of the cutting edge towards said lower surface and at least said central region of the cutting edge projects above said upper surface of the mounting body portion.

4. A cutting insert according to claim 3, wherein a rake surface of the cutting head portion slopes downwardly from the adjacent cutting edge to the upper surface of the mounting body portion.

5. A cutting insert according to claim 4, wherein said rake surface is continuously curved along the cutting edge so as to present an invariant rake angle when the insert is mounted in the tool.

6. A cutting insert according to claim 1, wherein a front relief surface of the cutting head portion adjacent the cutting edge slopes outwardly therefrom.

7. A cutting insert according to claim 1, wherein the cutting edge of the cutting head portion and the mounting body portion of the cutting insert are symmetrical with respect to a plane bisecting the angle defined between the side surfaces of the mounting body portion.

8. A cutting insert according to claim 1, wherein the cutting edge is asymmetrical with respect to a bisector plane of the mounting body portion.

9. A cutting insert according to claim 1, wherein the shape of the cutting edge is defined as a three-dimensional arc formed by an intersection of the sphere on which the cutting edge lies with a cylinder.

10. A cutting insert according to claim 1, wherein the cutting insert is double-sided and has a plane of symmetry passing between said upper and lower surfaces of the mounting body portion and parallel thereto, which plane divides the insert into upper and lower parts, the insert having indexable upper and lower cutting edges formed by the intersection between upper and lower rake surfaces with their interconnecting front relief surface.

11. A cutting insert according to claim 10, wherein said cutting edges are symmetrical with respect to said plane of symmetry.

12. A cutting insert according to claim 10, wherein said cutting edges are anti-symmetrical with respect to said plane of symmetry.

13. A cutting insert according to claim 1, wherein said insert mounting body portion is formed with a clamping screw bore passing through said upper and lower surfaces thereof transversely with respect thereto and transversely with respect to the radial direction in which said side surfaces of the mounting body portion are directed.

14. An end mill assembly comprising a tool holder having a longitudinal axis of rotation and a leading end portion having at least one insert receiving pocket with a cutting insert releasably mounted therein so as to be oriented generally in a radial plane of the tool holder passing through said axis;

said cutting insert comprising a cutting head portion with a substantially arcuate cutting edge and a substantially trapezoidal mounting body portion integrally formed therewith;

said mounting body portion having substantially planar upper and lower surfaces and substantially straight side surfaces converging in the direction away from said cutting head portion;

the insert receiving pocket having a shape mating the shape of the mounting body portion;

the entire cutting edge of said cutting head portion of the cutting insert lying on a sphere and defining an arc substantially less than 90°, said cutting head portion having an imaginary chordal plane passing through peripheral ends of said arc, said side surfaces of the mounting body portion being directed in a substantially radial direction with respect to a center of said sphere, and being substantially shorter than a length of said chordal plane extending between said peripheral ends of the arc; wherein said insert is configured to be radially mounted at said leading end portion of the tool holder of said cutting tool, with the insert's side surfaces being substantially shorter than a radial dimension of said leading end portion.

15. An end mill assembly according to claim 14, wherein the assembly is of a ball-nose type.

16. An end mill assembly according to claim 14, wherein said one insert receiving pocket is formed in the vicinity of a leading end of the tool holder so that one end of the cutting insert is located adjacent said longitudinal axis, to provide center cutting.

17. An end mill assembly according to claim 14, wherein said insert mounting body portion is formed with a clamping screw bore passing through said upper and lower surfaces thereof transversely with respect thereto and transversely with respect to the radial direction in which each side surface of the mounting body portion is directed, the cutting insert being mounted so that said clamping screw bore is substantially perpendicular to said radial plane of the tool holder.

18. A ball-nose end mill assembly according to claim 17, wherein a first pocket which is disposed adjacent the leading end of the tool holder and a second pocket disposed at a greatest distance from the leading end of the tool are located substantially on one side of a plane in which the longitudinal axis of the tool holder lies and a third pocket is located substantially on another side of said plane, the cutting inserts mounted in the first and second pockets being disposed so that their operative cutting edges overlap to define a 90°-arcuate cutting edge of the tool and the cutting insert mounted in the third pocket being mounted so as to double the effectiveness of cutting obtained by the end mill at its periphery.

19. A cutting insert according to claim 13, wherein said imaginary chordal plane crosses said clamping screw bore.

20. A cutting insert for mounting in a cutting tool, comprising a cutting head portion with a substantially arcuate upper cutting edge and a substantially trapezoidal mounting body portion integrally formed therewith; said mounting body portion having substantially planar upper and lower surfaces and substantially straight side surfaces converging in the direction away from said cutting head portion; said cutting edge sloping downwardly from a central region of the cutting edge towards said lower surface and to its peripheral ends so that the height of the cutting head portion at its front relief surface adjacent at least one of said peripheral ends has a minimal value, the thickness of the mounting body portion defined between said upper and lower surfaces thereof being substantially equal to said minimal value.

21. A cutting insert according to claim 20, wherein said cutting edge lies on a sphere and said side surfaces of the mounting body portion are directed substantially radially with respect to a center of said sphere, said insert mounting body portion being formed with a clamping screw bore passing through said upper and lower surfaces thereof transversely with respect thereto, and transversely with respect to the radial direction in which said side surfaces of the mounting body portion are directed.

22. A cutting insert according to claim 21, wherein an imaginary chordal plane passing through said peripheral ends of the cutting edge crosses said clamping screw bore.

23. A cutting insert for mounting in a cutting tool, comprising a cutting head portion with a substantially arcuate upper cutting edge and a substantially trapezoidal mounting body portion integrally formed therewith; said mounting body portion having substantially planar upper and lower surfaces and substantially straight side surfaces converging in the direction away from said cutting head portion; said cutting edge sloping downwardly from a central region of the cutting edge towards said lower surface and to its peripheral ends so that at least said central region projects above said upper surface of the mounting body portion, in a thickness direction defined between said upper and lower surfaces.

24. A cutting insert according to claim 23, wherein the cutting head portion is formed with an upper rake surface sloping downwardly from the adjacent cutting edge to the upper surface of the mounting body portion.

25. A cutting insert according to claim 23, wherein the height of the cutting head portion at its front relief surface adjacent at least one of said peripheral ends has a minimal value, the thickness of the mounting body portion defined between said upper and lower surfaces thereof being substantially equal to said minimal value.

26. A cutting insert according to claim 23, wherein said cutting edge lies on a sphere and said side surfaces of the mounting body portion are directed in a substantially radial direction with respect to a center of said sphere, said insert mounting body portion being formed with a clamping screw bore passing through said upper and lower surfaces thereof transversely with respect thereto, and transversely with respect to the radial direction in which said side surfaces of the mounting body portion are directed.

27. A cutting insert according to claim 26, wherein an imaginary chordal plane passing through said peripheral ends of the cutting edge crosses said clamping screw bore.

28. An end mill assembly comprising a tool holder having a longitudinal axis of rotation and a leading end portion having at least one insert receiving pocket with a cutting insert releasably mounted therein so as to be oriented generally in a radial plane of the tool holder passing through said axis;

said cutting insert comprising a cutting head portion with a substantially arcuate cutting edge and a substantially trapezoidal mounting body portion integrally formed therewith, said mounting body portion having substantially planar upper and lower surfaces and substantially straight side surfaces converging in the direction away from said cutting head portion;

the insert receiving pocket having a shape mating the shape of the mounting body portion;

the entire cutting edge of said cutting head portion of the cutting insert lying on a sphere and defining an arc substantially less than 90° said cutting head portion having an imaginary chordal plane passing through peripheral ends of said arc, said side surfaces of the mounting body portion being directed in a substantially radial direction with respect to a center of said sphere, and being substantially shorter than a length of said chordal plane extending between said peripheral ends of the arc; wherein a first pocket which is disposed adjacent the leading end of the tool holder and a second pocket disposed at a greatest distance from the leading end of the tool are located substantially on one side of a plane in which the longitudinal axis of the tool holder lies and a third pocket is located substantially on another side of said plane;

first and second cutting inserts mounted in respective first and second pockets are disposed such that their operative cutting edges overlap to define a 90°-arcuate cutting edge of the tool; and a third cutting insert mounted in the third pocket has an operative cutting edge which overlaps said first and second operative cutting edges, in an axial direction of the tool.

29. A cutting insert according to claim 1, wherein the side surfaces of the mounting body portion are each provided with an outwardly beveled surface.

30. An end mill assembly according to claim 14, wherein the side surfaces of the mounting body portion are each provided with an outwardly beveled surface arranged to abut a complementary surface formed on said tool holder.

31. A cutting insert comprising:
    a cutting head portion including:
        a front relief surface;
        a rake surface; and
        a substantially arcuate cutting edge defined between said front relief surface and said rake surface, said cutting edge lying on a sphere and defining an arc substantially less than 90°, said cutting edge being an upper cutting edge which slopes downwardly on either side from a central region thereof and terminates at peripheral ends thereof; and
    a mounting body portion integrally formed with said cutting head portion, said mounting body portion including:

upper and lower surfaces defining therebetween a maximum thickness of said mounting body portion; and side surfaces converging in the direction away from said cutting head portion and being directed in a substantially radial direction with respect to a center of said sphere, wherein:

said side surfaces are substantially shorter than a length of a chord connecting said peripheral ends;

the central region of the cutting edge projects above the upper surface of the mounting body portion; and a height of said front relief surface at said central region is greater than said maximum thickness defined between said upper and lower surfaces.

32. The cutting insert of claim 31, wherein the front relief surface comprises an upper relief flank portion sloping outwardly from said upper cutting edge.

33. The cutting insert of claim 31, wherein a height of said front relief surface adjacent at least one of said peripheral ends is substantially the same as said maximum thickness defined between said upper and lower surfaces.

34. The cutting insert of claim 31, wherein said insert mounting body portion is formed with a clamping screw bore passing through said upper and lower surfaces, and said chord crosses said clamping screw bore.

35. A cutting insert according to claim 31, wherein the cutting insert is double-sided and has a plane of symmetry passing between said upper and lower surfaces of the mounting body portion and parallel thereto, which plane divides the insert into upper and lower parts, the insert having indexable upper and lower cutting edges formed by the intersection between upper and lower rake surfaces with their interconnecting front relief surface.

* * * * *